Figures 1, 2:
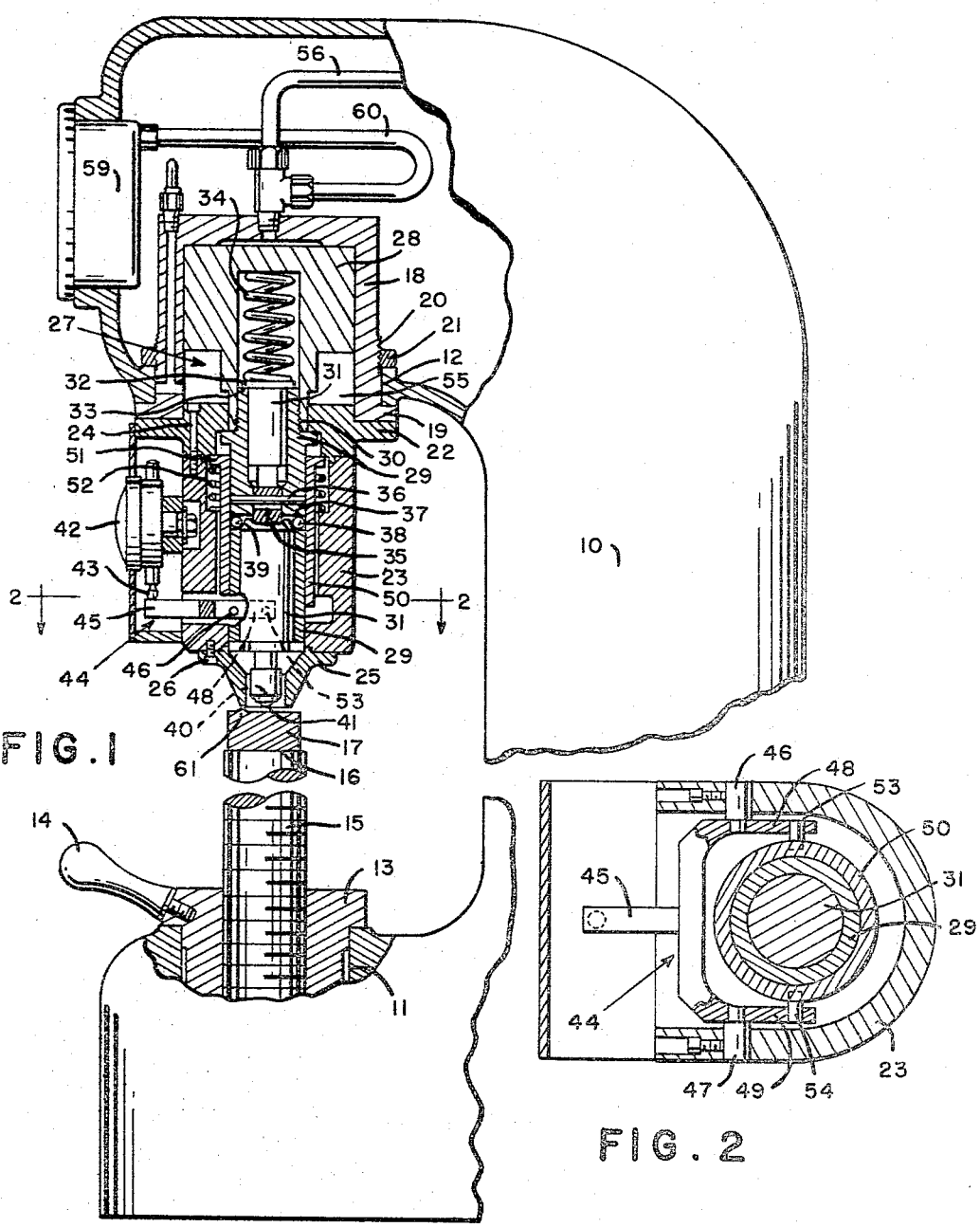

March 21, 1967     C. F. PEARSON     3,309,916

HARDNESS TESTER

Filed Nov. 18, 1963

INVENTOR.
CARL F. PEARSON

ATTORNEYS.

United States Patent Office 3,309,916
Patented Mar. 21, 1967

3,309,916
HARDNESS TESTER
Carl F. Pearson, Moline, Ill., assignor to Ametek, Inc., New York, N.Y., a corporation of Delaware
Filed Nov. 18, 1963, Ser. No. 324,509
5 Claims. (Cl. 73—81)

This invention relates to hardness testers and particularly to an improved Brinell type hardness tester.

Prior known testing apparatus of this type do not take into consideration surface irregularities of the specimen being tested. Consequently, when the surface of the test specimen is irregular, the indicator may start indicating before any depression in the specimen occurs.

The prinicpal object of the invention is to provide an indentation hardness tester in which indentation readings occur only during the actual indentation process.

Another object of the invention is to provide such a hardness tester in which the indentation ball can be moved a predetermined distance relative to the indentation indicator mechanism without the latter indicating such predetermined movement.

A hardness tester may comprise a C-frame base that is provided with a work support capable of being raised and lowered by screw or other suitable means. A ball indentation device may be supported by the frame above, and aligned with, the work support.

In one aspect of the invention, the ball indentation device may comprise a plunger, to one end of which a ball may be attached, and at the other end of which may be a head portion that rests on the top of a shoulder within a piston device that is adapted to be reciprocated within a cylinder mounted on the C-frame in alignment with the work support. A diamond type indentor or other types also could be used.

In another aspect of the invention, the piston device may be in two parts for assembly purposes, the lower part of which receives the plunger and is pinned to it through a lost motion connection.

In still another aspect of the invention, a reciprocable sleeve may surround the piston device and it may be urged to an upper datum position by a spring. A clutching device may be provided between the plunger and the reciprocable sleeve and arranged to become effective only after a predetermined downward movement of the piston device relative to the plunger.

In still another aspect of the invention, the lower edge of the reciprocable sleeve may contact diametrically disposed pins on parallel legs of a yoke, which legs embrace the sleeve. The legs may be pivoted to the C-frame along an axis parallel with that of the pins.

In a further aspect of the invention, a third leg, extending from the other two and parallel therewith, may contact the plunger of an indicating instrument mounted on the C-frame for indicating the movement of the plunger after it has been clutched to the reciprocable sleeve.

In a still further aspect of the invention, a spring may be provided between the head of the plunger and the end of a bore in the piston device to normally resiliently urge the two apart. Fluid means may be employed to actuate the piston device, there being a gauge provided for indicating the pressure applied to the ball during the indentation process.

The above, other objects and novel features of the hardness tester will become apparent from the following specification and accompanying drawing which is merely exemplary.

In the drawing:
FIG. 1 is a partial sectional elevational view of a hardness tester to which the principles of the invention have been applied; and FIG. 2 is a section taken substantially along line 2—2 of FIG. 1;

Referring to the drawing, the principles of the invention are shown as applied to a hardness tester including a C-frame 10 having aligned spaced openings 11 and 12 therein. An internally threaded sleeve 13 may be journaled within the opening 11 and held against axial movement. A handle 14 may be attached to sleeve 13 for rotating it.

A threaded shaft 15 may be threaded into sleeve 13 and it may include a work supporting surface 16 on which a workipece 17 may be placed, the hardness of which is desired to be known. Accordingly, rotating sleeve 13 in both directions will cause upward and downward movement of the work supporting surface 16.

A cylinder 18 is received within opening 12, and it includes a flange 19 and a threaded portion 20 on which a nut 21 is threaded to lock the cylinder 18 to the frame 10. A bored and counterbored flanged member 22 may be fixed to the open end of cylinder 18, and a hollow cylindrical member 23 may be fixed to member 22 by a cap screw 24. The lower end of member 23 may have fixed to it a hollow conical member 25 by screws 26. The members 22, 23 and 25 form an extension of cylinder 18. Within the cylinder 18 and its extensions 22, 23 and 25 may be located a piston device 27. It may comprise an upper bored portion 28 that is threaded to a lower portion 29 by threads 30. A plunger 31 may be located within the lower portion 29 of piston device 27 and it may extend from the top of portion 29 to the bottom of conical member 25.

The plunger 31 may include a flanged head 32 that is normally held against a shoulder 33 of portion 29 by a spring 34 between it and the end of the bore within the upper portion 28 of the piston device 27. The plunger 31 also may include a lost motion connection between it and the lower portion 29 of the piston device 27. Thus, a vertically elongated passage 35 may extend transversely through plunger 31, through which a pin 36 extends and which latter is anchored in the walls of portion 29.

The portion 29 may include radial passage 37 within which balls 38 may be located for free radial movement therein. The balls 38 are adapted to cooperate with a chamfered cam surface 39 on the plunger 31, all for a purpose to be described later.

The lower end of plunger 31 may include a semispherical recess 40 adapted to hold a ball 41 so that its lower half extends beyond the end of plunger 31 and with its lowermost point within the plane of the lower end of the conical member 25.

In order to indicate the degree of indentation of the ball 41 within the workpiece 17, an indicator gauge 42 may be mounted on the frame 10, and it may include the usual plunger 43. A pivotal yoke 44 may include an arm 45 adapted to engage the plunger 43. Referring to FIG. 2, the yoke 44 may be pivoted to the frame 10 by aligned pins 46 and 47. The yoke 44 may include two parallel spaced legs 48, 49 that embrace the portion 29 of piston device 27. A sleeve 50 may be located between the portion 29 and the member 23. It may be provided with a flange 51 at its upper end that is urged upwardly against member 22 by a spring 52. The lower end of sleeve 50 may rest on pins 53, 54 in legs 48, 49 of yoke 44.

Referring again to FIG. 1, pressure fluid may be admitted to cylinder 18 above piston 28, through line 56 from a supply source. The pressure of the fluid may be indicated by a gauge 59 which is connected to line 56 by a line 60.

With the apparatus in the condition shown in FIG. 1, i.e., with workpiece 17 on work supporting surface 16, and with conical member 25 in contact with a protuberance 61 on the workpiece, admitting pressure fluid to cylinder 18 above piston member 28 causes piston 27 to move downwardly and with it, plunger 31 through the action of spring 34 until ball 41 contacts the workpiece 17, whereupon plunger 31 stops. Further downward movement of piston 27 relative to plunger 31 is permitted by virtue of the space 35 beneath pin 36. This movement causes piston portion 29 to force balls 38 downwardly, thus causing cam surface 39 on plunger 31 to force said balls radially outwardly to frictionally engage sleeve 50. Further downward movement of piston 27 forces ball 41 into the surface of workpiece 17. Its movement during indentation is accompanied by a corresponding movement of sleeve 50 which compresses spring 52 and also moves legs 48, 49 clockwise about pivot pins 46, 47 (FIG. 2), thereby raising leg 45 and forcing plunger 43 of gauge 42 upwardly, effecting an indication of the degree of indentation at a pressure measured by gauge 59.

Exhausting the cylinder 18 above piston portion 28 causes spring 34 to raise the piston 27 relative to plunger 31 until pin 36 hits the top of passage 35, thereby releasing the frictional clutching engagement between balls 38 and sleeve 50 so that spring 52 raises the latter to the position shown in FIG. 1.

In the event there is no protuberance such as 61, ball 41 contacts the surface of workpiece 17 simultaneously with conical member 25 engaging it. Upon the opening of a control valve, piston 27 moves downwardly until pin 36 engages the bottom of passage 35 when the balls 38 frictionally engage sleeve 50 and the apparatus functions from this point as previously described.

From the foregoing it is evident that the hardness tester has the capability of accurately measuring the indentation of ball 41 into the surface of a specimen regardless of irregularities thereon and still can accurately measure such indentation if no irregularities are present.

Although the various features of the improved hardness tester have been shown and decribed in detail to fully disclose one embodiment of the invention, it will be evident that changes may be made in such details and certain features may be used without others without departing from the principles of the invention.

What is claimed is:

1. In a hardness tester, a frame; a work support; a plunger mounted in said frame in line with said work support; a ball held by said plunger at its end nearest said work support; means surrounding the end of said plunger that supports said ball; means for providing relative movement between said work support and said surrounding means to bring the two together in abutting relation; a cylinder fixed to said frame in line with said work support; a hollow piston within said cylinder having its upper end closed and its lower end open for receiving said plunger; an upper head on said plunger adapted to seat on an internal shoulder in said hollow piston; a spring between said upper head and the closed end of said piston; a lost motion connection between said piston and plunger that is ineffective by virtue of said spring when said ball encounters no resistance; fluid pressure means for operating said piston; a gauge on said frame for indicating the pressure of said pressure fluid; and indicator means cooperating with said piston for recording the movement of said plunger only when said ball encounters a resistance sufficient to effect compression of said spring.

2. In a hardness tester, a frame; a work support; a plunger mounted in said frame in line with said work support; a ball held by said plunger at its end nearest said work support; means surrounding the end of said plunger that supports said ball; means for providing relative movement between said work support and said surrounding means to bring the two together in abutting relation; a cylinder fixed to said frame in line with said work support; a piston within said cylinder having its upper end closed and its lower end open for receiving said plunger; an upper head on said plunger adapted to seat on an internal shoulder in said piston; a spring between said upper head and the closed end of said piston; a lost motion connection between said piston and plunger that is ineffective by virtue of said spring when said ball encounters no resistance; fluid pressure means for operating said piston; a gauge on said frame for indicating the pressure of said pressure fluid; an indicator on said frame; reciprocable means including lever means pivotally secured to said piston for operating said indicator; and clutching means between said plunger and indicator operating means, said lost motion connection when effective upon said ball encountering a resistance causing said clutching means to become effective to operate said indicator.

3. In a hardness tester, a frame; a work support; a plunger mounted in said frame in line with said work support; a ball held by said plunger at its end nearest said work support; means surrounding the end of said plunger that supports said ball; means for providing relative movement between said work support and said surrounding means to bring the two together in abutting relation; a cylinder fixed to said frame in line with said work support; a hollow piston within said cylinder having its upper end closed and its lower end open for receiving said plunger; an upper head on said plunger adapted to seat on an internal shoulder in said hollow piston; a spring between said upper head and the closed end of said piston; a lost motion connection including a transverse slot means cooperating with a transverse pin therein between said piston and plunger that is ineffective by virtue of said spring when said ball encounters no resistance; fluid pressure means for operating said piston; a gauge on said frame for indicating the pressure of said pressure fluid; an indicator on said frame; reciprocable means including rocking contact means for operating said indicator; radial holes through the walls of said hollow piston; and cam means on said plunger for forcing said balls radially outwardly into frictional contact with said reciprocable means upon relative movement between said plunger and piston.

4. In a hardness tester, a frame including a cylinder means therein; a work support adjustably secured to said frame; a plunger reciprocably mounted in said frame in line with said work support; sleeve means surrounding said plunger; a ball held by said plunger at its end nearest said work support; arcuate means secured to said sleeve means and surrounding the end of said plunger that supports said ball; adjustable screw means for providing relative movement between said work support and said surrounding means to bring the two together in abutting relation; a hollow piston in said cylinder; a plunger means within said piston; an indicator on said frame; reciprocable means including yoke and fulcrumed lever means interconnecting said piston with said sleeve means for operating said indicator; clutching means including ball means between said plunger and said piston; a lost motion pin and slot connection between said piston and plunger for rendering effective said clutching means, and means for actuating said piston whereby the hardness of metal may be tested in a hardness tester.

5. In a hardness tester as in claim 4, wherein said means for actuating said piston comprises fluid pressure means.

References Cited by the Examiner

UNITED STATES PATENTS

| | | | |
|---|---|---|---|
| 1,320,748 | 11/1919 | Fisher | 73—81 |
| 1,661,718 | 3/1928 | Davis | 73—81 |
| 1,806,767 | 5/1931 | Shore | 73—81 |
| 2,520,387 | 8/1950 | Dobry et al. | 73—81 |
| 3,078,710 | 2/1963 | Palmer | 73—81 |

RICHARD C. QUEISSER, *Primary Examiner.*

E. D. GILHOOLY, *Assistant Examiner.*